US009894672B2

(12) United States Patent
Qin et al.

(10) Patent No.: US 9,894,672 B2
(45) Date of Patent: Feb. 13, 2018

(54) METHOD AND ACCESS NETWORK DEVICE FOR INTERFERENCE COORDINATION

(75) Inventors: Fei Qin, Beijing (CN); Jinbo Zhao, Beijing (CN); Zhiqiu Zhu, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 121 days.

(21) Appl. No.: 13/142,828

(22) PCT Filed: Dec. 30, 2009

(86) PCT No.: PCT/CN2009/076224
§ 371 (c)(1),
(2), (4) Date: Jun. 29, 2011

(87) PCT Pub. No.: WO2010/075781
PCT Pub. Date: Jul. 8, 2010

(65) Prior Publication Data
US 2011/0280205 A1    Nov. 17, 2011

(30) Foreign Application Priority Data
Dec. 30, 2008    (CN) .......................... 2008 1 0247578

(51) Int. Cl.
*H04W 4/00*    (2009.01)
*H04W 72/12*    (2009.01)
(Continued)

(52) U.S. Cl.
CPC ..... *H04W 72/121* (2013.01); *H04W 28/0236* (2013.01); *H04W 72/082* (2013.01);
(Continued)

(58) Field of Classification Search
CPC ... H04W 4/08; H04W 28/0236; H04W 40/06; H04W 52/244; H04W 72/10;
(Continued)

(56) References Cited

U.S. PATENT DOCUMENTS 6,684,086 B2 * 1/2004 Miya ..................... H04W 16/28
  455/562.1
7,953,028 B2 * 5/2011 Lindoff et al. ................ 370/277
(Continued)

FOREIGN PATENT DOCUMENTS

CN         1953349      4/2007
EP       1 182 898 A1   2/2002
(Continued)

OTHER PUBLICATIONS

International Search Report and IPRP for corresponding PCT/CN2009/076224 dated Apr. 15, 2010 and Jul. 5, 2011.
(Continued)

*Primary Examiner* — Harun Chowdhury
(74) *Attorney, Agent, or Firm* — Ladas & Parry, LLP (57) ABSTRACT

The present invention discloses a method and access network device for interference coordination, said method comprises: getting time-frequency resource of cell, and dividing said time-frequency resource into multiple resource subsets; grouping users to be scheduled in the cell into multiple user groups according to AOA, the amount of said user groups is equal to the amount of said resource subsets, different user groups have different resource subset selection priority orders; allocating time-frequency resource of the resource subsets to users, which are in neighboring cells and have the same direction, according to said resource subset selection priority orders of the user groups. The present invention could reduce inter-cell co-frequency interference and improve channel quality.

14 Claims, 3 Drawing Sheets

(51) Int. Cl.
  *H04W 28/02* (2009.01)
  *H04W 72/08* (2009.01)
  *H04W 52/24* (2009.01)
  *H04W 4/08* (2009.01)
  *H04W 72/04* (2009.01)
  *H04W 72/10* (2009.01)

(52) U.S. Cl.
  CPC ............ *H04W 4/08* (2013.01); *H04W 52/244* (2013.01); *H04W 72/0446* (2013.01); *H04W 72/0453* (2013.01); *H04W 72/10* (2013.01)

(58) Field of Classification Search
  CPC ............. H04W 72/082; H04W 72/121; H04W 72/0446; H04W 72/0453
  USPC ...... 370/277, 329, 343, 254; 455/522, 562.1
  See application file for complete search history.

(56) References Cited

U.S. PATENT DOCUMENTS

| | | | |
|---|---|---|---|
| 8,023,989 B2* | 9/2011 | Chang et al. | 455/522 |
| 8,195,240 B2* | 6/2012 | Jin et al. | 455/562.1 |
| 2005/0237989 A1* | 10/2005 | Ahn et al. | 370/343 |
| 2005/0282550 A1* | 12/2005 | Cho et al. | 455/447 |
| 2008/0056187 A1 | 3/2008 | Soong et al. | |
| 2009/0268684 A1* | 10/2009 | Lott et al. | 370/329 |
| 2011/0096867 A1* | 4/2011 | Kang et al. | 375/295 |

FOREIGN PATENT DOCUMENTS

| | | |
|---|---|---|
| EP | 1 453 337 A1 | 9/2004 |
| WO | 2005/101987 A2 | 11/2005 |
| WO | 2008/130922 A2 | 10/2008 |

OTHER PUBLICATIONS

Office Action from corresponding EP App. No. 09836068.8 dated Feb. 13, 2017.
European Search Report for corresponding EP App. No. 09836068.8 dated Jun. 23, 2016.
Extended European Search Report for European Patent Application No. 09836068.8 dated Jun. 6, 2016.

* cited by examiner

METHOD AND ACCESS NETWORK DEVICE FOR INTERFERENCE COORDINATION

CROSS-REFERENCE TO RELATED APPLICATIONS

This application is the U.S. National Stage of International Patent Application No. PCT/CN2009/076224 filed on Dec. 30, 2009, which claims priority to Chinese Patent Application Number 200810247578.1 filed on Dec. 30, 2008, the disclosures of which are hereby incorporated by reference in their entireties.

FIELD OF THE PRESENT INVENTION

The present invention relates generally to the field of communication technology, and more particularly to method and access network device for interference coordination.

BACKGROUND OF THE PRESENT INVENTION

Figure 1:
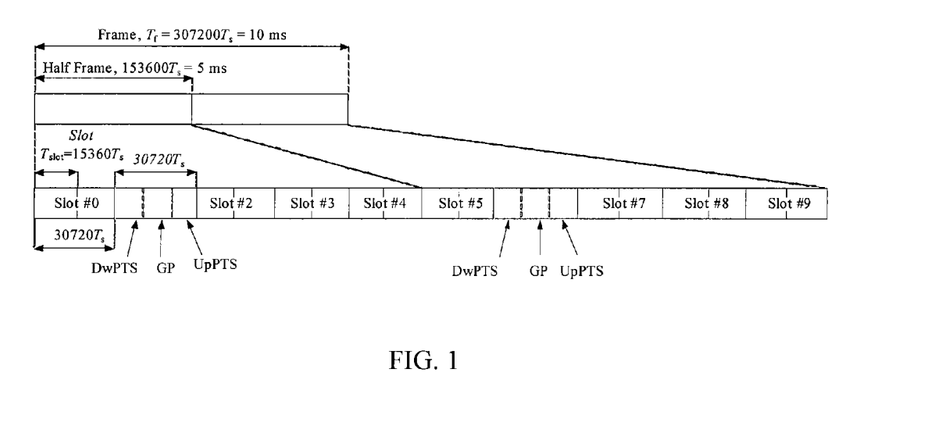
FIG. 1 is a frame structure diagram of LTE-TDD system in prior art.

In Long Term Evolution (LTE) system, Orthogonal Frequency Division Multiplexing (OFDM) technology is used, take LTE-Time Division Duplexing (LTE-TDD) system for example, its frame structure is shown in FIG. 1. The basic resource unit that could be scheduled by the LTE system is Physical Resource Block (PRB), each PRB comprising 12*15 KHz bandwidth and 1 ms time slot unit (subframe). In time domain of system, each frame could be divide into two half-frame, each half-frame could be divide into five subframe. In frequency domain of system, different bandwidth could be divided into 50 PRB or 100 PRB etc.

Under co-frequency networking condition, neighboring cell interference is the main interference. It should use interference suppression and interference coordination technology to reduce co-frequency interference and improve the spectral efficiency of the system.

Multi-antenna forming technology could effectively inhibit neighboring cell co-frequency interference, Multi-antenna forming technology is to improve intensity of useful signal in user direction and to inhibit interference power in other direction according to space beam, thus to improve receiving signal-to-noise ratio of useful signal. However, this interference suppression is random, when the locations of neighboring cell users and home cell users, which are scheduled on the same frequency band, are close, it could cause strong interference.

Interference coordination technology is widely used in LTE system, it generally comprises static part frequency multiplexing technology and semi-static interference coordination technology.

Principle of the static part frequency multiplexing technology is shown as follow: each cell-edge user could only use part of the entire available frequency band, and frequency resources of neighboring cell-edges are mutually orthogonal, on each cell edge, available frequency band could be sent under high power to improve edge performance; in the cell interior, it could use entire frequency resources, in order to reduce the interference to neighboring cell, it should limit the maximum transmitting power when using the frequency band of neighboring cell edge.

Semi-static interference coordination technology semi-statically adjustments resource subset allocated to cell-edge users by interacting resource using information through X2 interface (communication interface between eNBs). Each cell gets resource using information by estimating resource requirement of cell-edge users of home cell and detecting interference of each frequency band and other ways, and interacts resource using information through X2 interface, to achieve coordination between cells, thus to reduce inter-cell interference.

In current method for interference coordination, the home cell users and neighboring cell users scheduled on the same subband is completely random, that would cause the follow problems:

1) Quality of user channel will vary with the location change of neighboring cell users scheduled on the same frequency band, so there could be a condition that channel interference is strong;

2) Quality of user channel will vary with the location change of neighboring cell users scheduled on the same frequency band, so when the system uses Adaptive Modulation and Coding (AMC) technology, it's difficult to accurately forecast channel quality, that increases the Block Error Rate (BLER).

SUMMARY OF THE PRESENT INVENTION

The embodiments of the present invention provide a method and access network device for interference coordination, to reduce inter-cell co-frequency interference and improve channel quality.

Therefor, the embodiments of the present invention provide the technical scheme as follow:

The embodiment provides a method for interference coordination, wherein, comprising:

getting time-frequency resource of cell, and dividing said time-frequency resource into multiple resource subset;

grouping users to be scheduled in the cell into multiple user groups according to AOA, the amount of said user groups is equal to the amount of said resource subset, different user groups have different resource subset selection priority orders;

allocating time-frequency resource in resource subset to users, which are in neighboring cells and have the same direction, according to said resource subset selection priority orders of the user groups.

The embodiment provides an access network device, wherein, comprising:

resource getting module, is used for getting time-frequency resource of cell;

resource grouping module, is used for dividing said time-frequency resource into multiple resource subset;

user grouping module, is used for grouping users to be scheduled in the cell into multiple user groups according to AOA, the amount of said user groups is equal to the amount of said resource subset, different user groups have different resource subset selection priority orders;

resource allocating module, is used for allocating time-frequency resource in resource subset to users, which are in neighboring cells and have the same direction, according to said resource subset selection priority orders of the user groups.

The embodiments of the present invention provides a method and access network device for interference coordination, getting time-frequency resource of cell, dividing said time-frequency resource into multiple resource subset, grouping users to be scheduled in the cell into multiple user groups according to AOA, the amount of said user groups is equal to the amount of said resource subset, different user groups have different resource subset selection priority orders, allocating time-frequency resource in resource subset to users, which are in neighboring cells and have the same direction, according to said resource subset selection priority orders of the user groups. Therefor, the embodiments of the present invention could ensure that home cell users and neighboring cell users with same direction information preferentially use mutually orthogonal time-frequency resource, thus could reduce the probability that home cell users and neighboring cell users with same direction information preferentially use same time-frequency resource, comprising the probability that home cell edge users and neighboring cell edge users with same direction information preferentially use same time-frequency resource, that could reduce inter-cell co-frequency interference and improve channel quality.

DETAILED DESCRIPTION OF THE EMBODIMENTS OF THE PRESENT INVENTION

To make technical personnel of the field better understand the scheme of the embodiments of the present invention, in the following parts, further detailed descriptions of the embodiments of the present invention are made combined with drawings and implementation methods.

The embodiments of the present invention provides a method and access network device for interference coordination, getting time-frequency resource of cell, dividing said time-frequency resource into multiple resource subset, grouping users to be scheduled in the cell into multiple user groups according to AOA, the amount of said user groups is equal to the amount of said resource subset, different user groups have different resource subset selection priority orders, allocating time-frequency resource in resource subset to users, which are in neighboring cells and have the same direction, according to said resource subset selection priority orders of the user groups. Therefor, the embodiments of the present invention could ensure that home cell users and neighboring cell users with same direction information preferentially use mutually orthogonal time-frequency resource, that could reduce inter-cell co-frequency interference.

Figure 2:
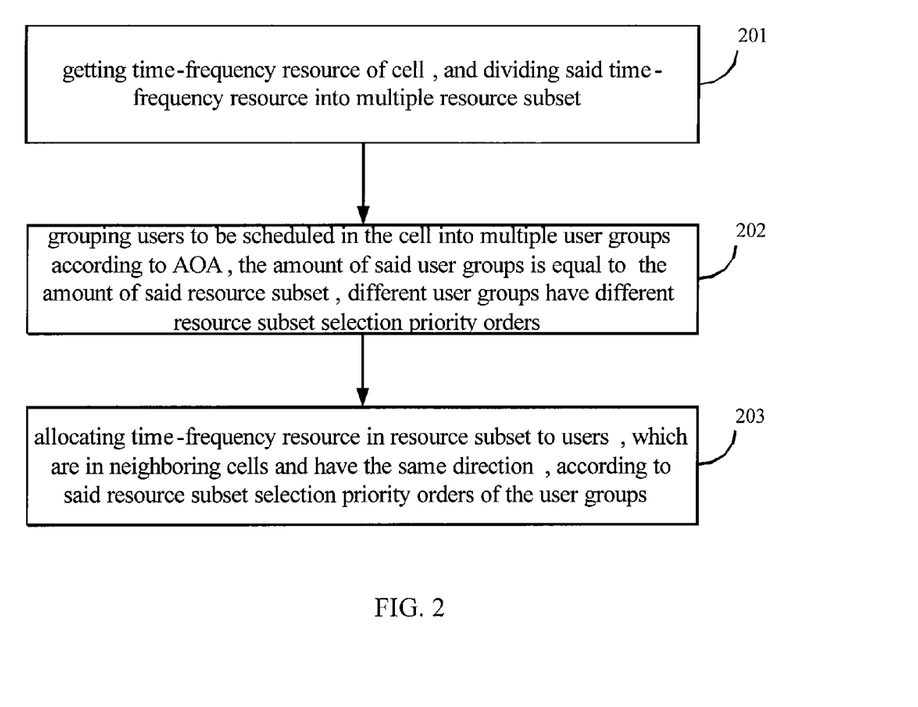
FIG. 2 is a flow diagram of a method for interference coordination of an embodiment of the present invention.

FIG. 2 is a flow diagram of a method for interference coordination of an embodiment of the present invention, mainly comprising the following steps:

Step 201, getting time-frequency resource of cell, and dividing said time-frequency resource into multiple resource subsets.

When system groups time-frequency resource, to downlink time-frequency resource, the system divides time-frequency resource by using one or more continuous PRB as a minimum unit; to uplink time-frequency resource, the system does resource subset division to continuous time-frequency resource according to principle of mutually orthogonal.

Specifically, the system could statically configure the amount of time-frequency resource in each resource subset, and could also dynamically configure the appropriate amount of time-frequency resource in each resource subset. Simply, the system could configure the amount of time-frequency resource in each resource subset according to the principle that the amount of time-frequency resource is proportional to the amount of users or business requirement. In each resource subset, the time-frequency resource could be continuous, it could also be discontinuous.

Step 202, grouping users to be scheduled in the cell into multiple user groups according to Angle of Arrival (AOA), the amount of said user groups is equal to the amount of said resource subset, different user groups have different resource subset selection priority orders.

Specifically, the system could divide angle space into multiple mutually orthogonal angle subspace according to AOA, each angle subspace is corresponding to a user group; the system determines user group, which the user belongs to, according to angle subspace which said user belongs to.

When the system allocates time-frequency resource, users in different user group corresponds to different resource subset selection priority orders. For example, the resource subset selection priority orders respectively corresponding to user group 1 to user group N are shown as follow:

User group 1: resource subset 1→resource subset 2→resource subset 3 . . . resource subset N;

User group 2: resource subset 2→resource subset 3 . . . resource subset N→resource subset 1;

. . .

User group N: resource subset N→resource subset 1→resource subset 2→resource subset 3 . . . ;

In practice, at the stage of the network initial planning, system could determine the amount of user groups, and determine resource subset selection priority order corresponding to each user group, according to location of each cell, to ensure that user groups with the same direction preferentially use time-frequency resource in different resource subset.

In order to better coordinate resource and adapt changes in the distribution of business and users, after the system has completed configuring grouping information, eNB sends its user group information, resource subset information, and resource subset selection priority order corresponding to each user group to neighboring cell, said user group information comprises AOA of user, resource subset selection priority order corresponding to each user group could be indicated by numbers of resource subsets. In LTE system, these information could be transmitted through X2 interface between eNBs. After cell receive the grouping information of neighboring cell, it could adjust resource subset and resource subset selection priority order corresponding to each user group basing on the principle that time-frequency resources used by user groups with the same direction are not conflict.

Furthermore, at the stage of the network initial planning, user group information, resource subset information, and resource subset selection priority order corresponding to each user group could also be configured into eNB the neighboring cell belongs to. When any of user group information, resource subset information, and resource subset selection priority order corresponding to each user group is change, home cell would send change information to the neighboring cell. After cell receive the change information of neighboring cell, it could adjust resource subset and resource subset selection priority order corresponding to each user group basing on the principle that time-frequency resources used by user groups with the same direction are not conflict.

Step 203, allocating time-frequency resource in resource subset to users, which are in neighboring cells and have the same direction, according to said resource subset selection priority orders of the user groups.

For example, in advance, the system could establish mapping relation between user group and resource subset selection priority order, specifically, the system could establish mapping relation between user group and resource subset selection priority order according to the principle shown as follow: selects resource subset with top priority in resource subset selection priority order for one of user groups, resource subset with top priority in resource subset selection priority order corresponding to different user group is different.

In this way, when cell does scheduling on each subframe, it allocates time-frequency resource for each user according to user group of the user and said mapping relation.

Generally, neighboring cell interference is stronger to cell-edge users, but neighboring cell interference is not strong to cell-center user, therefore, in specific applications, the system could only grouping the cell-edge users, correspondingly, the system could only divide part of time-frequency resource of system. In this way, the system could establish mapping relation between user group and resource subset selection priority order according to the principle shown as follow: selects resource subset with top priority in resource subset selection priority order for one of user groups, resource subset with top priority in resource subset selection priority order corresponding to different user group is different; sets the resource subset with top priority to cell-edge user group has lowest selection priority to cell-center user.

Basing on four color theory, generally, four resource subsets could basically ensure that users at same location in different cells use different time-frequency resource. In the embodiments of the present invention, to users in any neighboring cells, the users at mutually neighbor locations belongs to different user groups, the system allocates time-frequency resource for users to be scheduled, according to the mapping relation between user group and resource subset selection priority order, therefore, it could ensure to allocate different time-frequency resource to users which are in neighboring cells and have the same direction. In LTE system, there are 50-100 PRB resources, and the time resources also could be further divided, therefore, the method of the embodiments of the present invention could reduce inter-cell co-frequency interference effectively.

The allocation process of time-frequency resource in the embodiments of the present invention will be further illustrated by following example.

Example 1, Grouping all Users of the Cell

Suppose that it is in three sectors LTE-TDD system, the allocation is to downlink time-frequency resource, and the amount of user groups and resource subsets is N=4.

(1) The system groups all users of the cell into four user groups, namely: $U_0$, $U_1$, $U_2$, $U_3$.

The azimuth information of user could be defined by AOA measured at eNB, the AOA is defined as user's estimated angle relative to reference direction. AOA information could be got by spectrum estimation (such as MUSIC spectrum estimation, ESPRIT algorithm, etc). Take MUSIC spectrum estimation for example, AOA could be got by the following manner: first, eNB gets sampled signal value sequence with AOA information, and constructs correlation matrix; then, does eigen-decomposition to correlation matrix, estimates amount of signals by multiplicity of minimal eigenvalue; finally, calculates MUSIC spectrum and constructs cost function, the direction corresponding to peak value of the cost function is the AOA of the signal.

Figure 3:
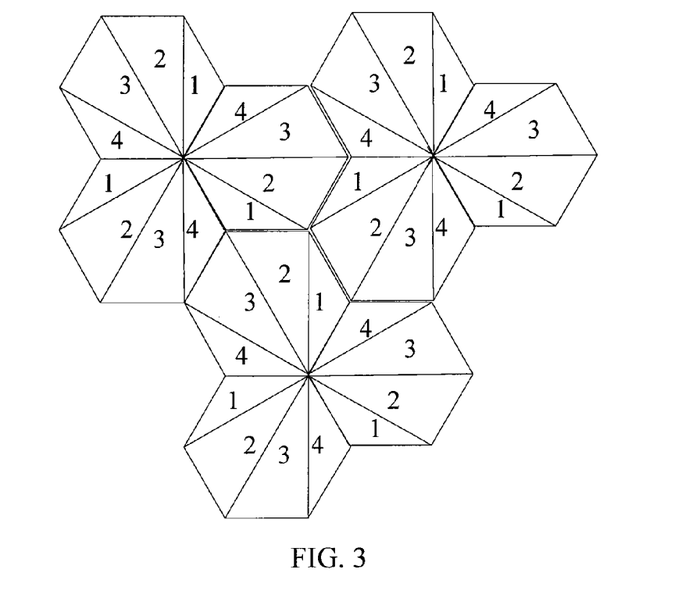
FIG. 3 is a diagram of grouping users basing on four color theorem in an embodiment of the present invention.

It could use the method basing on four color theorem shown in FIG. 3 to group downlink users, grouping users by the granularity of $$\frac{\pi}{6}.$$

specifically, in three sectors system, suppose that the AOA value range of sector 0 is $$[-\frac{\pi}{3}, \frac{\pi}{3}),$$

the AOA value range of sector 1 is $$[\frac{\pi}{3}, \pi),$$

the AOA value range of sector 2 is $$[\pi, \frac{5\pi}{3}).$$

To user in sector 0: if the AOA of user j conform to $$AOA_j \in [-\frac{\pi}{3}, -\frac{\pi}{6}),$$

then $j \in U_0$; if the AOA of user j conform to $$AOA_j \in [-\frac{\pi}{6}, 0),$$

then $j \in U_1$; if the AOA of user j conform to $$AOA_j \in [0, \frac{\pi}{6}),$$

then $j \in U_2$; if the AOA of user j conform to $$AOA_j \in [\frac{\pi}{6}, \frac{\pi}{3}),$$

then $j \in U_3$.

To user in sector 1: if the AOA of user j conform to $$AOA_j \in [\frac{\pi}{3}, \frac{\pi}{2}),$$

then j∈U₀; if the AOA of user j conform to $$AOA_j \in \left[\frac{\pi}{2}, \frac{2\pi}{3}\right),$$

then j∈U₁; if the AOA of user j conform to $$AOA_j \in \left[\frac{2\pi}{3}, \frac{5\pi}{6}\right),$$

then j∈U₂; if the AOA of user j conform to $$AOA_j \in \left[\frac{5\pi}{6}, \pi\right),$$

then j∈U₃.

To user in sector 2: if the AOA of user j conform to $$AOA_j \in \left[\pi, \frac{7\pi}{6}\right),$$

then j∈U₀; if the AOA of user j conform to $$AOA_j \in \left[\frac{7\pi}{6}, \frac{4\pi}{3}\right),$$

then j∈U₁; if the AOA of user j conform to $$AOA_j \in \left[\frac{4\pi}{3}, \frac{3\pi}{2}\right),$$

then j∈U₂; if the AOA of user j conform to $$AOA_j \in \left[\frac{3\pi}{2}, \frac{5\pi}{3}\right),$$

then j∈U₃.

(2) The system divides time-frequency resource into four resource subsets, time-frequency resource in each resource subset could be continuous, or discontinuous.

Resource subset dividing needs to determine the minimum unit for dividing time-frequency resource, in the present embodiment, the system uses subframe configuration 0 (references 3GPP TS 36.221, V8.0.0) to do resource subset dividing, the size of Resource Block group (RB group) is p=4 under 20 MHz bandwidth, that means the minimum unit for dividing time-frequency resource is four PRBs.

Specifically, sets that the total amount of available PRB in system is PRBNum, the PRB with number i (0≤i<PRBNum) is PRB$_i$, the size of RB group is p, the amount of resource subsets is N=4, resource subset k is R$_k$ (0≤k<N), then the resource subset that PRBi belongs to is shown as follow:

In the case that $$0 \leq i < \left\lfloor\frac{PRBNum}{N \cdot p}\right\rfloor \cdot N \cdot p \text{ and } \left\lfloor\frac{PRBNum}{N \cdot p}\right\rfloor \cdot N \cdot p \leq i < \left\lfloor\frac{PRBNum}{p}\right\rfloor \cdot p:$$

If k·p≤i mod N·p<(k+1)·p, then PRB$_i$ belongs to resource subset k;

If $$\left\lfloor\frac{PRBNum}{p}\right\rfloor \cdot p \leq i < PRBNum,$$

then PRB$_i$ belongs to the resource subset which the PRB with number $$\left\lfloor\frac{PRBNum}{p}\right\rfloor \cdot p - 1$$

belongs to.

To 20 MHz system, if PRBNum=100, p=4, then resource subsets that cell users could use are shown as follow:

$$R_0 = \left\{\begin{matrix}0, 1, 2, 3, 16, 17, 18, 19, 32, 33, 34, 35, 48, 49, 50, 51,\\ 64, 65, 66, 67, 80, 81, 82, 83, 96, 97, 98, 99\end{matrix}\right\};$$

$$R_1 = \left\{\begin{matrix}4, 5, 6, 7, 20, 21, 22, 23, 36, 37, 38, 39, 52, 53, 54, 55,\\ 68, 69, 70, 71, 84, 85, 86, 87\end{matrix}\right\};$$

$$R_2 = \left\{\begin{matrix}8, 9, 10, 11, 24, 25, 26, 27, 40, 41, 42, 43, 56, 57, 58, 59,\\ 72, 73, 74, 75, 88, 89, 90, 91\end{matrix}\right\};$$

$$R_3 = \left\{\begin{matrix}12, 13, 14, 15, 28, 29, 30, 31, 44, 45, 46, 47, 60, 61, 62, 63,\\ 76, 77, 78, 79, 92, 93, 94, 95\end{matrix}\right\}.$$

(3) The system establishes the mapping relation between user group and resource subset.

For users belong to U$_k$, the resource subset selection priority order is: R$_k$→R$_{k+1}$→ . . . →R$_{N-1}$→R$_0$→ . . . R$_{k-1}$.

Specifically, in the present embodiment:

For users belong to U₀, the resource subset selection priority order is R₀→R₁→R₂→R₃;

For users belong to U₁, the resource subset selection priority order is R₁→R₂→R₃→R₀;

For users belong to U₂ the resource subset selection priority order is R₂→R₃→R₀→R₁;

For users belong to U₃, the resource subset selection priority order is R₃→R₀→R₁→R₂.

Thus, when cell schedules each subframe, the cell could allocate time-frequency resource for user according to the user group, which the user belongs to, and the above-mentioned mapping relation.

Example 2, Grouping Cell-Edge Users

Suppose that it is in three sectors LTE-TDD system, the allocation is to uplink time-frequency resource, and the amount of user groups and resource subsets is N=4.

(1) User Grouping

It comprises two procedures to group uplink user: divides cell-center users and cell-edge users, and groups cell-edge users.

There are many method for dividing cell-center users and cell-edge users: for example, system could divide users according to Reference Signal Receiving Power (RSRP), pilot signal strength, reference signal receiving quality, pilot signal Channel Quality Indicator (CQI); system also could divide users according to detected path loss information or Signal to Interference plus Noise Ratio (SINR) information of users in the cell.

Specifically, when system divides cell-center users and cell-edge users according to RSRP, it could achieve the division basing on RSRP difference value between neighboring cell and home cell:

1. The eNB configures measure and instructs User Equipment (UE) to measure RSRP of neighboring cell and home cell, if the result of neighboring cell RSRP subtracting home cell RSRP is more than the threshold TH1 (TH1 could be in a range (−2 dB to −5 dB)), and trigger condition is met, then UE sends the measure report to the eNB, the eNB determines that UE is on cell edge after receiving the measure report; if the result of neighboring cell RSRP subtracting home cell RSRP is less than the threshold TH2 (TH1>TH2), and trigger condition is met, then UE sends the measure report to the eNB, the eNB determines that UE is on cell center after receiving the measure report.

2. The UE measure report comprises three RSRP difference value between neighboring cell and home cell, there is a time interval between each two adjacent measures of the RSRP difference values, the eNB could get location information of UE according to the measure report. For example, if three continuous RSRP difference value respectively are −7, −3, 1, then the eNB could determine that the UE is moving from cell center to cell edge.

It could use method for grouping users in Example 1, to group uplink cell-edge users basing on AOA.

(2) Resource Subset Dividing

Figure 4:
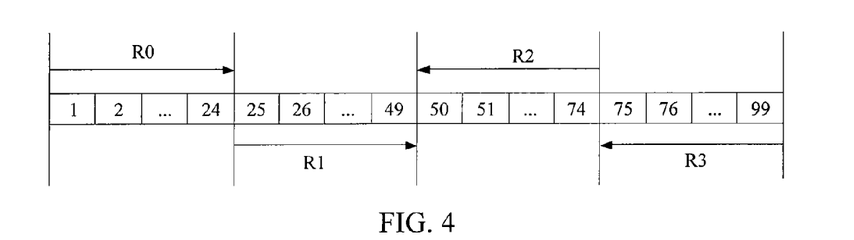
FIG. 4 is a diagram of a division of resource subset in an embodiment of the present invention.

To 20 MHz system, time-frequency resource for cell-edge users is divided into four resource subsets, time-frequency resource in each resource subset is continuous.

Suppose there are 100 available time-frequency resources, then each resource subset comprises 25 available time-frequency resources. Specifically, it is shown in FIG. 4:

Resource subset 0 could comprise time-frequency resources with number 0~24, the time-frequency resource with lesser number has the higher using priority;

Resource subset 1 could comprise time-frequency resources with number 25~49, the time-frequency resource with lesser number has the higher using priority;

Resource subset 2 could comprise time-frequency resources with number 50~74, the time-frequency resource with bigger number has the higher using priority;

Resource subset 3 could comprise time-frequency resources with number 75~99, the time-frequency resource with bigger number has the higher using priority.

(3) Establishing mapping relation between user group and resource subset:

For users belong to $U_k$, the cell-edge user resource subset selection priority order is: $R_k \to R_{k+1} \to \ldots \to R_{N-1} \to R_0 \to \ldots R_{k-1}$; cell-center user selection priority order is: $R_{k+1+\lfloor N/2 \rfloor} \to \ldots \to R_{N-1} \to R_0 \to \ldots \to R_{k-1} \to R_{k+\lfloor N/2 \rfloor} \to \ldots \to R_k$.

Specifically, in the present embodiment:

The cell-edge user resource subset selection priority order of the users belongs to $U_0$ is: $R_0 \to R_1 \to R_2 \to R_3$, cell-center user resource subset selection priority order is: $R_2 \to R_3 \to R_1 \to R_0$;

The cell-edge user resource subset selection priority order of the users belongs to $U_1$ is: $R_1 \to R_2 \to R_3 \to R_0$, cell-center user resource subset selection priority order is: $R_2 \to R_3 \to R_0 \to R_1$;

The cell-edge user resource subset selection priority order of the users belongs to $U_2$ is: $R_2 \to R_3 \to R_0 \to R_1$, cell-center user resource subset selection priority order is: $R_0 \to R_1 \to R_3 \to R_2$;

The cell-edge user resource subset selection priority order of the users belongs to $U_3$ is: $R_3 \to R_0 \to R_1 \to R_2$, cell-center user resource subset selection priority order is: $R_1 \to R_2 \to R_0 \to R_3$.

The method for interference coordination of the embodiments of the present invention is not only available in LTE-TDD system, it is available in any system that could schedule resource respectively on time domain and frequency domain, and exists directivity interference. The method could ensure to allocate mutually orthogonal time-frequency resources to cell-edge users in neighboring cell and home cell with same direction information, thus could reduce the probability that cell-edge users in neighboring cell and home cell use same time-frequency resource, reduce inter-cell co-frequency interference, and improve channel quality.

Furthermore, combining with scheduling strategy, the method could achieve space diversity gain, improve system capacity. Specifically, the system could pair users in different user groups with higher space isolation, and schedule same time-frequency resource to the paired users. Each paired user could be distinguished by direction information.

In the method for interference coordination of the embodiments of the present invention, in order to flexibly adapt the diversification of business, load, resource requirement of cell-edge users in different cell, and not increase complexity and load of X2 interface, the system could adjust user group information and/or resource subset information in semi-static mode. In the system basing on multi-antenna forming technology, besides common load information, such as High Interference Indicator (HII), Overload Indicator (OI), Relative Narrowband Tx Power (RNTP), etc, cells also could communicate angle information of user and resource subset information etc. After the neighboring cell has received the information from home cell, the neighboring cell will do corresponding adjustment, and sends the adjustment result to the home cell through X2 interface.

In the embodiments of the present invention, the system could dynamically adjust user group information and/or resource subset information according to AOA distribution of cell-edge users, business load distribution of cell-edge user group, etc. For example, after a long period statistics, if it is found that amount of users belong to $U_0$ is larger, but the amount of users belong to $U_1$ is less, then the system could adjust the division configuration of resource subsets. The adjusting result is that the resource subset divided for $U_0$ is adjusted to time-frequency resources with number 0~29, and the resource subset divided for $U_1$ is adjusted to time-frequency resources with number 30~49. Then, home cell sends the adjusting result to neighboring cell through X2 interface, the neighboring cell does adjustment, that is useful to home cell and neighboring cell, according to this result, if the neighboring cell exists same condition, then the neighboring cell could do same adjustment. Otherwise, the neighboring cell does not need to change, the home cell adjusts the using priority of the time-frequency resources in R1, using priority of the resource with lesser number is adjusted from high to low, the home cell sends the adjustment result to neighboring cell through X2 interface, after several adjustments, it would achieve equilibrium that cost function of each adjacent sectors has minimum value.

General technical personnel in this field could understand that all or part of the steps of method in above-mentioned embodiments could be achieved by using program to instruct hardware, said program could be stored in storage medium that computer could read, such as ROM/RAM, disk, CD-ROM, etc.

Figure 5:
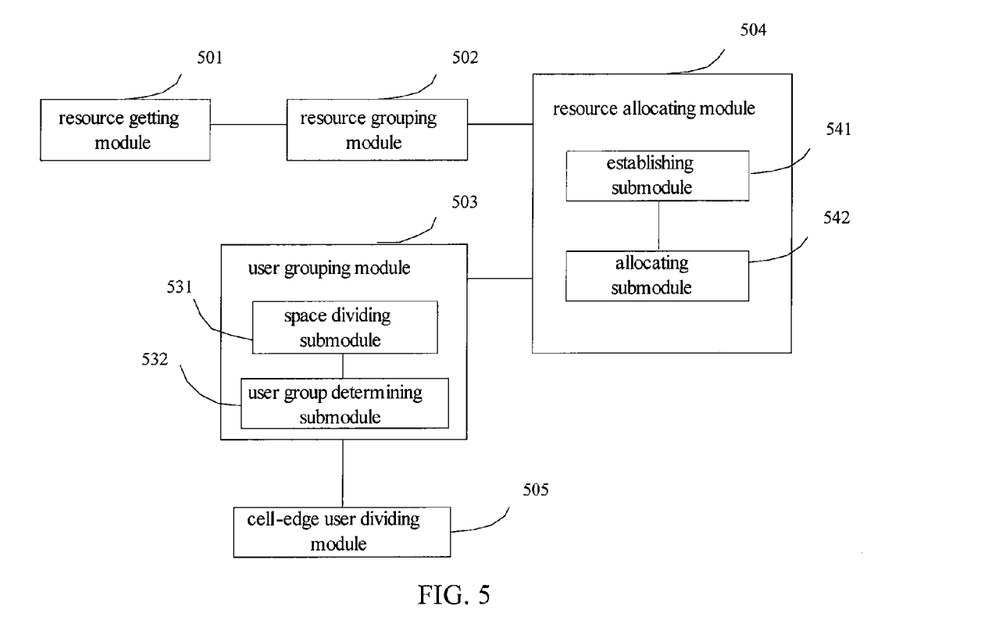
FIG. 5 is a structure diagram of an access network device of an embodiment of the present invention.

An access network device is provided in the embodiment of the present invention, FIG. 5 is a structure diagram of the access network device, the access network device comprises: Resource getting module 501, Resource grouping module 502, User grouping module 503, Resource allocating module 504. Therein: resource getting module 501, is used for getting time-frequency resource of cell; resource grouping module 502, is used for dividing said time-frequency resource into multiple resource subset; user grouping module 503, is used for grouping users to be scheduled in the cell into multiple user groups according to AOA, the amount of said user groups is equal to the amount of said resource subset (generally 3 or 4), different user groups have different resource subset selection priority orders; resource allocating module 504, is used for allocating time-frequency resource in resource subset to users, which are in neighboring cells and have the same direction, according to said resource subset selection priority orders of the user groups.

Specifically, when resource grouping module 502 divides time-frequency resource, to downlink time-frequency resource, could divide time-frequency resource by using one or more continuous PRB as a minimum unit; to uplink time-frequency resource, could do resource subset division to continuous time-frequency resource according to principle of mutually orthogonal. Certainly, resource dividing mode of the embodiments of the present invention is not limited to this.

User grouping module 503 needs to divide users in the cell according to the location of the users, in specific implementation, user grouping module 503 could is comprise: space dividing submodule 531 and user group determining submodule 532. Therein, space dividing submodule 531, is used for dividing angle space into multiple mutually orthogonal angle subspace according to AOA, each angle subspace is corresponding to a user group; user group determining submodule 532, is used for determining user group, which the user belongs to, according to angle subspace which said user belongs to.

Resource allocating module 504 needs to allocate time-frequency resource in resource subset to users with the same direction and in neighboring cells, according to said resource subset selection priority order corresponding to user group. In specific implementation, resource allocating module 504 could comprise establishing submodule 541 and allocating submodule 542. Therein:

Establishing submodule 541, is used for establishing mapping relation between user group and resource subset selection priority order, when establishing mapping relation between user group and resource subset selection priority order, it could be according to the following principle: selecting resource subset with top priority in resource subset selection priority order for one of user groups, resource subset with top priority in resource subset selection priority order corresponding to different user group is different.

Allocating submodule 542, is used for allocating time-frequency resource for each user according to user group of the user and said mapping relation, when scheduling on each subframe.

Certainly, the structure of said resource allocating module 504 is not limited to the above mentioned form, it also could be other forms.

In order to flexibly adapt the diversification of business, load, resource requirement of cell-edge users in different cell, the access network device of the embodiment of the present invention could further comprise: communication module and updating module (not shown in the figures). Therein, said communication module, is used for sending change information to the neighboring cell, when any of user group, resource subset, and mapping relation between user group and resource subset selection priority order is change; said updating module, is used for adjusting home cell user group, and/or home cell resource subset, and/or home cell mapping relation between user group and resource subset selection priority order, according to said change information, after receiving the change information of neighboring cell.

Neighboring cell interference is stronger to cell-edge users, but neighboring cell interference is not strong to cell-center user, therefore, in specific applications, the system could only grouping the cell-edge users, correspondingly, the system could only divide part of time-frequency resource of system. That also could ensure that users in neighboring cells and with the same direction preferentially use different time-frequency resources.

For this reason, the access network device of the embodiment of the present invention could further comprise: cell-edge user dividing module 505, is used for dividing cell-center users and cell-edge users, according to Reference Signal Receiving Power, or pilot signal strength, or reference signal receiving quality, or pilot signal CQI, or detected path loss information, or SINR information of each user in said cell.

In this case, said user grouping module 503 only groups cell-edge users divided by cell-edge user dividing module 505. Correspondingly, resource getting module 501 could only get part of time-frequency resource of the cell; or resource getting module 501 gets all time-frequency resource of the cell, resource grouping module 502 selects part of time-frequency resource to do grouping. In practice, that could be flexibly set.

The access network device of the embodiment of the present invention could allocate mutually orthogonal time-frequency resources to cell-edge users in neighboring cell and home cell with same direction information, thus could reduce the probability that cell-edge users in neighboring cell and home cell use same time-frequency resource, reduce inter-cell co-frequency interference, and improve channel quality.

The embodiment of the present invention is detailed above. In the article, the present invention is elaborated by specific implementation methods. Illustration of the embodiments is only used to help to understand method and device of the present invention. Meanwhile, to general technical personnel in this field, basing on the idea of the invention, the specific implementation method and application scope could be diversification. Therefore, content of the present description would not be understood as limitation of the present invention.

The invention claimed is:
1. A method for interference coordination, comprising:
obtaining time-frequency resource of a cell, and dividing the time-frequency resource into a plurality of resource subsets;
dividing users to be scheduled in the cell into a plurality of user groups according to Angle Of Arrival (AOA) of wave, wherein the number of the user groups is equal to the number of the resource subsets, and each of the user groups has its respective sequence of priorities for selecting among the resource subsets;

transmitting information on the user group comprising the AOA, information on the resource subsets, and the respective sequence of priorities for selecting among the resource subsets for each of the user groups in the cell to neighboring cells, after said dividing users to be scheduled in the cell into a plurality of user groups according to AOA of wave, wherein each of the neighboring cells adjusts the resource subsets and the respective sequence of priorities for selecting among the resource subsets for each user group of a plurality of user groups in the neighboring cell based on a rule that the time-frequency resource of one of the user groups in the neighboring cell is not conflicted with the time-frequency resource of one of the user groups in the cell, while the AOA of one of the user groups in the neighboring cell is same as that of one of the user groups in the cell, after receiving the information on the user group comprising the AOA, information on the resource subsets, and the respective sequence of priorities for selecting among the resource subsets for each of the user groups in the cell; and allocating the time-frequency resource in the one of the resource subsets to the users of one of the user groups with the same AOA, according to the sequence of priorities for selecting among the resource subsets for one of the user groups.

2. The method of claim 1, wherein said dividing the time-frequency resource into a plurality of resource subsets comprising:

dividing downlink time-frequency resource included in the time-frequency resource into the resource subsets in a minimum unit of one or more continuous Physical Resource Block (PRB); and dividing uplink time-frequency resource included in the time-frequency resource into the resource subsets by dividing continuous time-frequency resource according to a rule of mutually orthogonal of time-frequency resource.

3. The method of claim 1, wherein said dividing users to be scheduled in the cell into a plurality of user groups according to AOA of wave comprising:

dividing angle space for receiving a signal into a plurality of mutually orthogonal angle subspaces according to the AOA, wherein each of the angle subspaces is corresponding to a respective one of the user groups; and determining a user group that the user belongs to among the plurality of the user groups, according to an angle subspace that the user belongs to among the plurality of the angle subspaces.

4. The method of claim 1, wherein said allocating the time-frequency resource in one of the resource subsets to the users of the user groups with the same AOA, according to the sequence of priorities for selecting among the resource subsets for one of the user groups comprising:

establishing a mapping relation between each of the user groups and its respective sequence of priorities for selecting among the resource subsets in advance in each of the neighboring cells; and allocating the time-frequency resource to the users in each neighboring cell according to the user groups that the users belong to and the mapping relation, when the users in each neighboring cell are scheduled in each subframe.

5. The method of claim 4, wherein establishing the mapping relation between each of the user groups and its respective sequence of priorities for selecting among the resource subsets according to a following rule:

selecting the resource subset with a highest priority in sequence of priorities for selecting among the resource subsets for one of the user groups, wherein the resource subset with the highest priority for one of the user groups is different from the resource subset with the highest priority for another one of the user groups in the respective sequence of priorities for selecting among the resource subsets.

6. The method of claim 4, further comprising:

transmitting an update information to the neighboring cells, when anyone of the user groups, the resource subsets, and the mapping relation between each of the user groups and its respective sequence of priorities for selecting among the resource subsets is changed, wherein each of the neighboring cells adjusts the user groups, and/or the resource subsets, and/or the mapping relation between each of the user groups and its respective sequence of priorities for selecting among the resource subsets in the neighboring cell according to the update information of the cell, after receiving the update information of the cell.

7. The method of claim 1, wherein the time-frequency resource is a portion of time-frequency resource of the cell, and the users to be scheduled are at an edge of the cell, the method further comprising:

differentiating the users at the edge of the cell from the users in a center of the cell based on Reference Signal Receiving Power (RSRP), or pilot signal strength, or Reference Signal Receiving Quality (RSRQ), or pilot signal Channel Quality Indicator (CQI), or detected path loss information, or Signal and Interference to Noise Ratio (SINR) information on each user in the cell.

8. An access network device, comprising:

a processor; and a non-volatile storage medium, configured to be connected to the processor via a bus interface, and store programs and data to be used by the processor, wherein upon the processor executes the programs and data stored in the non-volatile storage medium, following modules are implemented:

a resource obtaining module, configured for obtaining time-frequency resource of a cell;

a resource grouping module, configured for dividing the time-frequency resource into a plurality of resource subsets;

a user grouping module, configured for dividing users to be scheduled in the cell into a plurality of user groups according to Angle Of Arrival (AOA) of wave, wherein the number of the user groups is equal to the number of the resource subsets, and each of the user groups has its respective sequence of priorities for selecting among the resource subsets;

a transmitting module, configured for transmitting information on the user group comprising the AOA, information on the resource subsets, and the respective sequence of priorities for selecting among the resource subsets for each of the user groups in the cell to neighboring cells, after said dividing users to be scheduled in the cell into a plurality of user groups according to AOA of wave, wherein each of the neighboring cells adjusts the resource subsets and the respective sequence of priorities for selecting among the resource subsets for each user group of a plurality of user groups in the neighboring cell based on a rule that the time-frequency resource of one of the user groups in the neighboring cell is not conflicted with the time-frequency resource of one of the user groups in the cell, while the AOA of one of the user groups in the neighboring cell is same as that of one of the user groups in the cell, after receiving the information on the user group comprising the AOA, information on the resource subsets, and the respective sequence of priorities for selecting among the resource subsets for each of the user groups in the cell; and a resource allocating module, configured for allocating the time-frequency resource in the one of the resource subsets to the users of one of the user groups with the same AOA, according to the sequence of priorities for selecting among the resource subsets for one of the user groups.

9. The device of claim 8, wherein the resource grouping module is configured for:

dividing downlink time-frequency resource included in the time-frequency resource into the resource subsets in a minimum unit of one or more continuous Physical Resource Block (PRB); and dividing uplink time-frequency resource included in the time-frequency resource into the resource subsets by dividing continuous time-frequency resource according to a rule of mutually orthogonal of time-frequency resource.

10. The device of claim 8, wherein the user grouping module comprising:

a space dividing submodule, configured for dividing angle space for receiving a signal into a plurality of mutually orthogonal angle subspaces according to the AOA, wherein each of the angle subspaces is corresponding to a respective one of the user groups; and a user group determining submodule, configured for determining a user group that the user belongs to among the plurality of the user groups, according to an angle subspace that the user belongs to among the plurality of the angle subspaces.

11. The device of claim 8, wherein the resource allocating module comprising:

an establishing submodule, configured for establishing a mapping relation between each of the user groups and its respective sequence of priorities for selecting among the resource subsets in each of the neighboring cells; and allocating the time-frequency resource to the users in each neighboring cell according to the user groups that the users belong to and the mapping relation, when the users in each neighboring cell are scheduled in each subframe.

12. The device of claim 11, wherein the establishing submodule establishing the mapping relation between each of the user groups and its respective sequence of priorities for selecting among the resource subsets according to a following rule:

selecting the resource subset with a highest priority in sequence of priorities for selecting among the resource subsets for one of the user groups, wherein the resource subset with the highest priority for one of the user groups is different from the resource subset with the highest priority for another one of the user groups in the respective sequence of priorities for selecting among the resource subsets.

13. The device of claim 11, wherein the device is further configured for implementing a communication module when the processor executes the programs and data stored in the non-volatile storage medium, the communication module is configured for transmitting an update information to the neighboring cells, when anyone of the user groups, the resource subsets, and the mapping relation between each of the user groups and its respective sequence of priorities for selecting among the resource subsets is changed, wherein each of the neighboring cells adjusts the user groups, and/or the resource subsets, and/or the mapping relation between each of the user groups and its respective sequence of priorities for selecting among the resource subsets in the neighboring cell according to the update information of the cell, after receiving the update information of the cell.

14. The device of claim 8, wherein the time-frequency resource is a portion of time-frequency resource of the cell, and the users to be scheduled are at an edge of the cell, the device is further configured for implementing a cell-edge user differentiating module when the processor executes the programs and data stored in the non-volatile storage medium, the cell-edge user differentiating module is configured for differentiating the users at the edge of the cell from the users in a center of the cell based on Reference Signal Receiving Power (RSRP), or pilot signal strength, or Reference Signal Receiving Quality (RSRQ), or pilot signal Channel Quality Indicator (CQI), or detected path loss information, or Signal and Interference to Noise Ratio (SINR) information on each user in the cell, wherein the user grouping module divides the users to be scheduled at the edge of the cell into a plurality of user groups according to the AOA.

* * * * *